United States Patent [19]

Rawson et al.

[11] 3,808,889

[45] May 7, 1974

[54] HEAT FLOW TRANSDUCER FOR THERMAL SURVEYS

[76] Inventors: Donald E. Rawson, RFD 147;
Norman D. Greene, RFD 148, both of Del Mar, Calif. 92014; H. Wayne Hoylman, 2234 Loma Vista St., Pasadena, all of Calif. 91104

[22] Filed: Oct. 5, 1972

[21] Appl. No.: 295,368

[52] U.S. Cl.................................. 73/154, 73/341
[51] Int. Cl............................................ E21b 49/00
[58] Field of Search ......... 73/154, 341, 342, DIG. 7

[56] References Cited
UNITED STATES PATENTS
3,693,447   9/1972   Sumikama ........................... 73/341
3,714,832   2/1973   Howell................................. 73/154

*Primary Examiner*—S. Clement Swisher
*Attorney, Agent, or Firm*—Brown and Martin

[57] ABSTRACT

Heat flow transducer for use in measuring the geothermal heat flow in the earth. The transducer utilizes copper alloy flexible wire bundles at opposite ends of an elongated body to conduct heat from the strata surrounding a bore hole, into the body of the transducer, and through thermally conductive elements, into contact with a solid state thermopile. The thermopile includes a plurality of semi-conductor elements, electrically in series and thermally in parallel, to produce a usable electrical output at very low heat flows. Multiple modules of semi-conductor elements are employed. The modules are separated by a heat conductive, but electrically insulated layer between modules.

10 Claims, 4 Drawing Figures

PATENTED MAY 7 1974 3,808,889

HEAT FLOW TRANSDUCER FOR THERMAL SURVEYS

BACKGROUND OF THE INVENTION

It has long been recognized that an instrument capable of detecting and measuring the geothermal components of the heat flow in the earth, would be valuable for several purposes. In connection with known strata, such a signal is indicative of anomalies existing in the area. Such anomalies include moving bodies of underground water that tend to reduce the normal heat flow expected for that strata, and geothermal energy sources leading to the location of developable geothermal energy resources. Other possible uses for such a system include any situation where there is a need for qualitative and quantitative data about the movement of underground water, artificial, or natural and the determination of thermal conductivity in regions of known heat flow.

Despite the value of heat flow data, prior art systems have not been sufficiently accurate to have general practicability. In one prior art technique, thermistors are utilized, spaced by predetermined distances. The temperature differential between the spaced thermistors is taken as a measure of temperature gradient. This approach has inherent disadvantages, in that precise calibration of the thermistors is necessary. The inherent inaccuracy in this method makes it necessary to drill relatively deeper holes to obtain a sufficiently large temperature differential.

Therefore, it is highly desirable to have a heat flow transducer that is capable of measuring heat flows in the earth, that is of sufficient accuracy to enable heat flow determinations at a single instrument position.

SUMMARY OF THE INVENTION

An exemplary embodiment of the invention utilizes an elongated tubular body portion suitable for introduction into a drill or bore hole. At opposite ends of the body, there are attached head means. These head means act as a cap for the tubular body portion and also receive and transmit the heat from flexible means for conducting heat from the walls of the bore hole. The flexible means are comprised of bundled copper alloy wires. The wires have a high conductivity, and their resilience maintains them in intimate contact with the bore hole to produce a low thermal resistance connection to the surrounding strata. A second and important function of the flexible copper alloy wires is spacing of the transducer from the bore hole walls, so that it may be lowered and retrieved from the bore hole, while maintaining a good thermal contact with the bore hole walls at all times. The heat flux from the copper alloy wires at opposite ends of the transducer unit is carried by thermal conductor means, comprising a bar of aluminum or similar thermally conductive material. Thus a low heat resistance path is created from the walls of the bore hole, through the copper wires, head means, and the thermal conductor bars, to the proximity of the center of the transducer. At the center of the transducer, thermopile means are mounted in thermal contact with opposing thermal conductor bars.

The thermopile means (a thermoelectric generator) is comprised of a plurality of semi-conductor junctions comprising paired P and N type semiconductor elements, connected by conductor bars in electrical series. A planar module is employed in constructing the thermopile so that a plurality of semiconductor junctions connected in electrical series may be arranged so that each junction presents a heat receptive surface that lies in a common plane. A plurality of modules are employed. Connection is made between adjacent modules so that the electrical series relationship of the semiconductor junctions is maintained. The heat relationship is maintained in parallel. That is, each semiconductor element is exposed to the heat from the heat conducting bars. Adjacent modules are separated by an electrically insulative layer that may comprise a ceramic. A 15 to 20 mil thickness of polycrystaline hot-pressed alumina form is practical and efficient for this purpose. Such a material is electrically insulative but represents substantially a thermal short so that there is a continued low resistance path to the heat flux along the heat conductor bars between the upper and lower head and brush means.

The output of the thermopile is a DC voltage proportional to the heat flow through the transducer. This signal may be conducted, without amplification, by suitable lead wires, up the suspending cable to the surface. Measurements of the heat flow are made directly on a microvoltmeter or a potentiometric recorder with no filtering or other elaborate electronic processing necessary.

The heat flow transducer of the invention is capable of measuring, in shallow bore holes, heat flow in the earth (geothermal heat flow) to a sufficient accuracy that when utilized in conjunction with strata of known properties, and with information on local climatic conditions, will enable resolution of the energy components comprising the total geothermal heat flow.

It is therefore an object of this invention to provide a new and improved heat flow transducer for use in thermal surveying.

It is another object of this invention to provide a new and improved heat flow transducer that is highly accurate.

It is another object of this invention to provide a new and improved heat flow transducer that is extremely sensitive.

It is another object of this invention to provide a new and improved heat flow transducer that may be introduced into a bore hole in the earth.

It is another object of this invention to provide a new and improved heat flow transducer that produces a low thermal resistance connection to the walls of the bore hole.

It is another object of the invention to provide a new and improved heat flow transducer that does not require elaborate read out apparatus.

Other objects and many attendant advantages of this invention will become more apparent upon a reading of the following detailed description, together with the drawings in which like reference numerals designate like parts throughout and in which.

Figure 1:
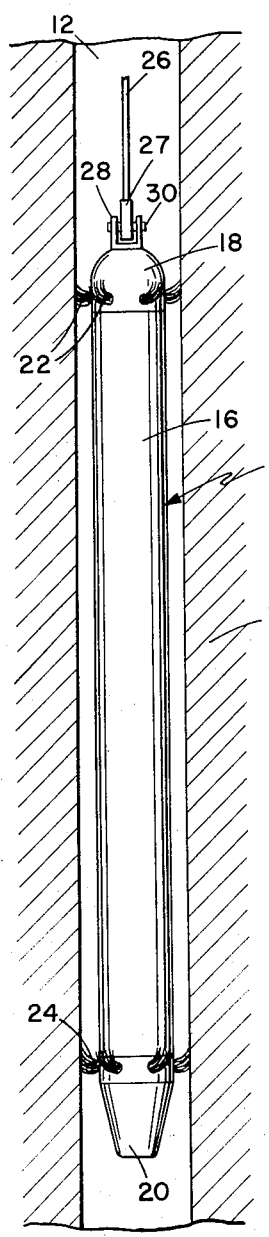
FIG. 1 is a view of the heat flow transducer in a bore hole.
Figure 3:
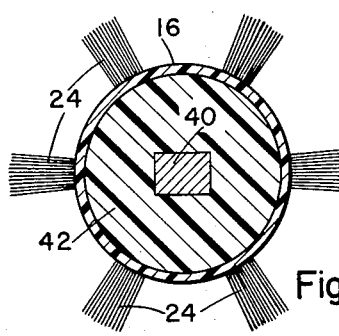
FIG. 3 is a sectional view taken on line 3—3 of FIG. 2.
Figure 2:
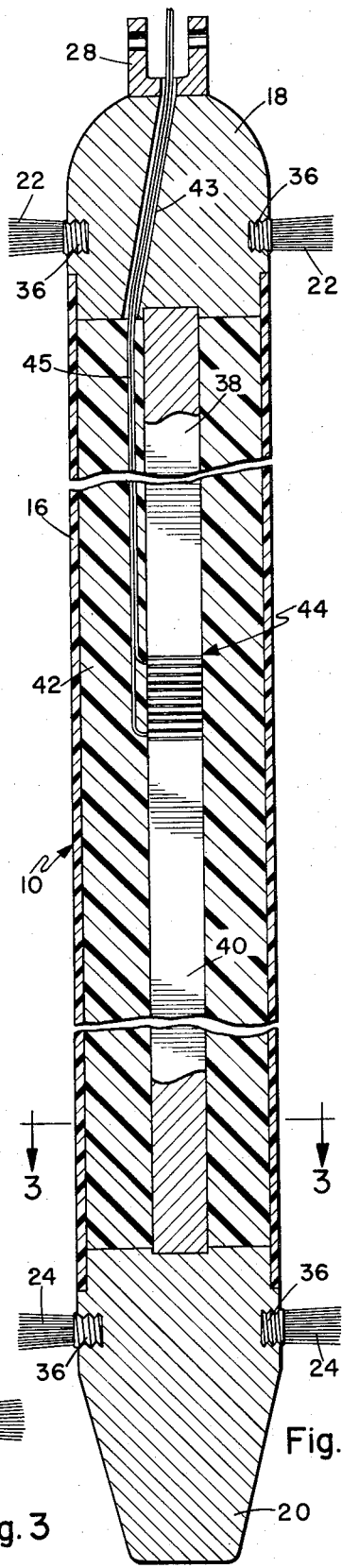
FIG. 2 is an enlarged axial sectional view of the transducer unit.

Referring now to the drawings, there is illustrated a heat flow transducer 10 suspended from a cable 26.

The transducer is suspended in a bore hole 12 in the earth strata 14.

A transducer 10 includes a cylindrical body shell 16 and insulative filler 42. The shell 16 may be of a high impact plastic material, and has electrical and heat insulative properties. Mounted at opposite ends of the body shell are the head means 18 and 20. The head forms both a cap for the body portion and a mount for the upper and lower flexible means 22 and 24. The flexible means 24 and 22 comprise a bundle of copper alloy wire gathered into a screw base portion 36. Base portion 36 is screwed into the respective head means 18 and 20. By this connection a good heat conductive path is provided from the walls of the bore hole 12 through the flexible means 22 and 24 and into the head means 18 and 20.

The head means 18 in addition to mounting the flexible means 22 includes a suspensory bracket 28 which is secured by a pin 30 to the terminal portion 27 of cable 26. A bore 43 through the head means 18 provides a path through which the electrical connecting wires 45 to the thermopile 44 may pass and be secured around the cable 26 so as to be accessible to the instrumentation at the surface. The thermopile is shown exaggerated in height for clarity.

The heat conductive path to the thermopile 44 is completed by upper and lower thermal conductor means 38 and 40. The thermal conductor means comprise rectangular bars of aluminum or similar heat conductive material, sized to transfer heat to the entire cross section of the thermopile.

Figure 4:
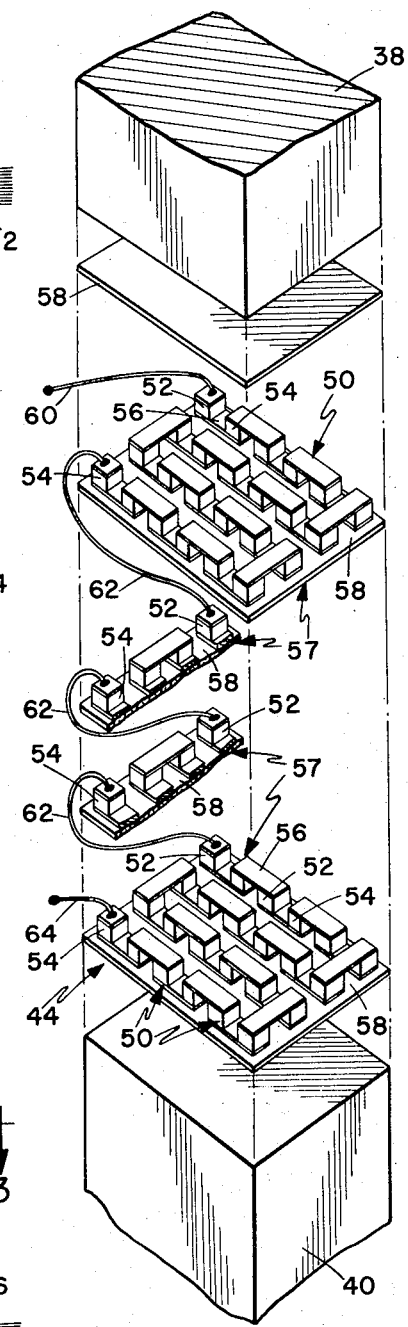
FIG. 4 is an exploded view of the construction of the thermopile.

Referring now to FIG. 4, the detailed construction of the thermopile is illustrated. Thermopile 44 is built up of a plurality of pairs of N and P semi-conductor junctions 50 arranged on a plurality of modules 57. Each junction comprises N and P elements 52 and 54 joined by a conductor bar 56. The conductor bars 56 are arranged to electrically connect all semi-conductor junctions in a given thermopile module, electrically in series, so that the electrical conductor 60 is connected through each semi-conductor junction on the first module, and between adjacent modules, by the interconnecting conductors 62, to the output conductor 64. Only four modules of the ten utilized in the preferred embodiment are illustrated to permit adequate detail.

Each semi-conductor junction 50 comprises N and P semi-conductor elements 52 and 54 of bismuth/tellurium. Heat is transferred from the heat conductor means 38 to each junction in parallel, so that a portion of the total heat flow is transferred through each semiconductor junction. Since the thermal conductor bars 38 and 40 are also electrically conductive, it is necessary to separate the bars from the copper shorting bars by an electrically insulating layer 58. Similarly, it is necessary to electrically isolate adjacent modules by additional layers 58. The layers 58, while being electrically insulative, are highly thermally conductive. A suitable material for this electrically insulative-heat transferring layer is polycrystaline hot-pressed alumina. By utilizing the alumina in thickness on the order of 15 to 20 mils, the heat conductivity is maximized while preserving the electrical insulative properties.

OPERATION

In use, the transducer of the invention is lowered into a bore hole 12 by a cable 26 to the desired investigative depth. At the selected depth, the transducer is in thermal communication with the earth strata 14, through the flexible means 22 and 24. Because of the construction of the device, there is essentially a thermal short between the uper flexible element 22 and the lower flexible element 24. Thus, the heat flux that exists in the area is diverted through the thermopile 44. The thermopile element 44 utilizes a plurality of layered modules, so that the total heat flow passes through a plurality of semi-conductor junctions 50. The total number of semi-conductor junctions are electrically in series so that the signal generated in each is additive. The output of the thermopile is a DC signal proportional to the heat flux or thermal graident. This electrical signal is transmitted to the surface by wire pair 45. A conventional micro voltmeter is utilized to provide a reading that is directly proportional to the heat flux being sensed. Temperature gradients at least as small as $2 \times 10^{-6\circ}$ C. per centimeter are detectable with the device of the invention.

The investigator may compare the heat flux being sensed with the known properties of the strata under investigation to determine the actual geothermal heat flow through the strata.

Having described our invention, we now claim:

1. A heat flow transducer for use in thermal surveys to measure that flow in a bore hole, that enables instantaneous heat flow measurement at a single transducer position, comprising, an elongated body,
   means positioned at opposite ends of said body,
   said means for maintaining heat conducting contact with the walls of said bore hole,
   thermal conductor means for transmitting heat flow from said flexible means to the opposite sides of thermopile means,
   said thermopile means for converting heat flow into an electrical signal,
   whereby heat flow resulting from temperature gradients at least as small as $2 \times 10^{-6\circ}$ C. per centimeter may be utilized in conjunction with known parameters to determine either variations to total heat flow or local thermal conductivity.

2. The heat flow transducer of claim 1 wherein,
   said means is additionally for maintaining said body in spaced relation from the walls of said bore,
   each of said means comprising a plurality of flexible heat conducting fiber bundles.

3. The heat flow transducer of claim 2 wherein,
   said fiber bundles comprises a quantity of copper alloy wires secured together at one end of said bundle.

4. The heat flow transducer of claim 2 further comprising,
   head means for receiving and retaining said bundles and for conducting heat between said bundles and said thermal conductor means.

5. The heat flow transducer of claim 4 wherein,
   said body comprises an elongate cylindrical shell of heat insulative material,
   said head means being received in opposite ends of said shell.

6. The heat flow transducer of claim 1 wherein,
   said thermopile means comprises a plurality of semi-conductor junctions connected electrically in series and thermally in. parallel.

7. The heat flow transducer of claim 6 wherein, a plurality of said semi-conductor junctions are connected together to form a module,
a plurality of said modules are stacked with adjacent modules being separated by a layer of heat conductive and electrically insulating material.

8. The heat flow transducer of claim 7 wherein, said heat conductive and electrically insulating material is comprised of ceramic.

9. The heat flow transducer of claim 7 wherein, said heat conductive and electrically insulating material is comprised of polycrystaline alumina.

10. The heat flow transducer of claim 6 wherein, said semi-conductor junctions comprise N and P type bismuth/tellurium elements.

* * * * *